Figure 1:
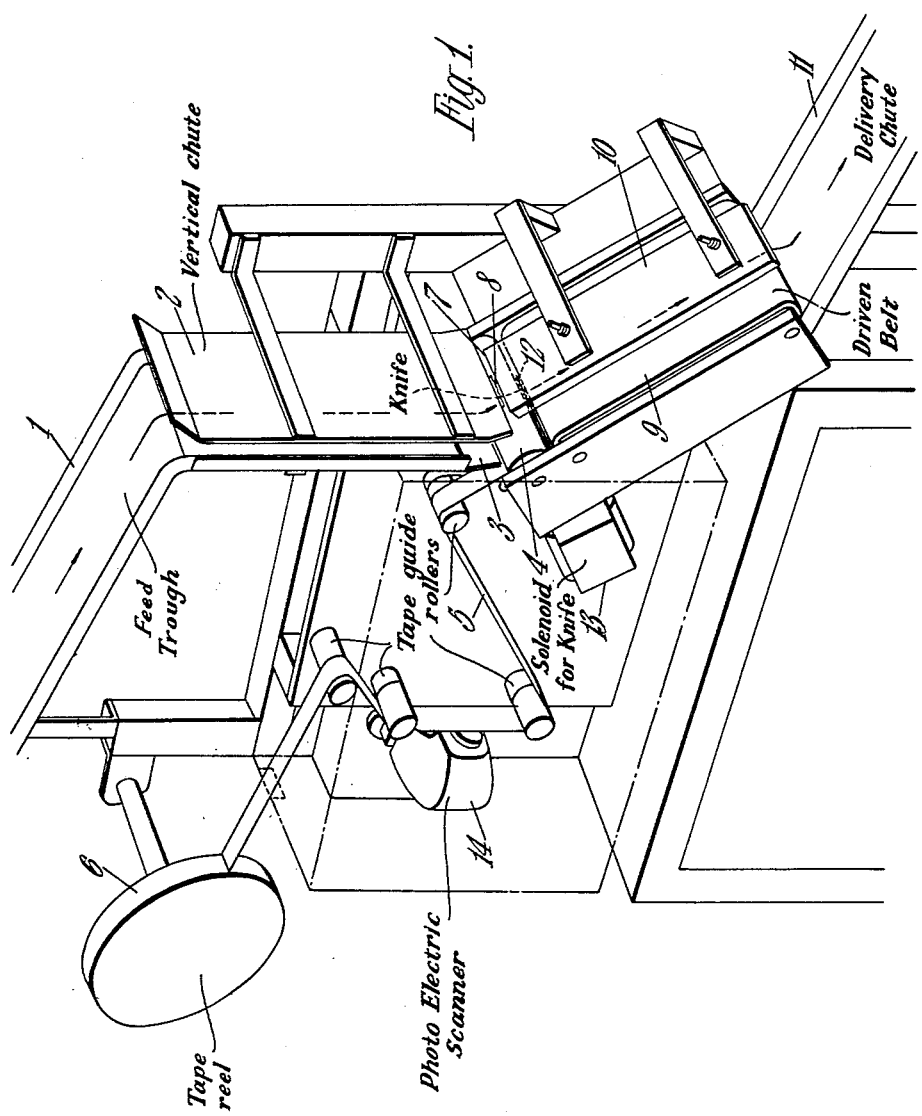

Aug. 4, 1964  C. S. LARKIN  3,143,452
DEVICE FOR APPLYING ADHESIVE TAPE
Filed Sept. 14, 1961  2 Sheets-Sheet 1

Aug. 4, 1964

C. S. LARKIN 3,143,452

DEVICE FOR APPLYING ADHESIVE TAPE

Filed Sept. 14, 1961

2 Sheets-Sheet 2

United States Patent Office 3,143,452
Patented Aug. 4, 1964

3,143,452
DEVICE FOR APPLYING ADHESIVE TAPE
Cyril Stanley Larkin, Boreham Wood, England, assignor to Adhesive Tapes Limited, Bristol, England, a British company
Filed Sept. 14, 1961, Ser. No. 138,165
Claims priority, application Great Britain Oct. 5, 1960
6 Claims. (Cl. 156—522)

This invention relates to a device for applying adhesive tape around the surface of a cylindrical object as an arc or as a complete band. This is an operation which is often required for labelling purposes.

The invention consists in a machine for applying pressure sensitive adhesive tape to cylindrical objects, comprising an extended runway for the objects defined between a driven belt and an opposed wall member positioned so that an object to be taped may be rolled by the belt along said wall member, the entrance to the runway being defined between a driven roller and an opposed, backing member for the objects between which the successive objects may be caught and rolled by the roller into engagement with the driven belt, the machine further comprising means for feeding pressure sensitive adhesive tape so that a forward end portion thereof will lie against the driven roller with its adhesive face outwards, and means for severing adhesive tape operable between the driven roller and the belt.

Generally, an end-locating means will be provided for the cylindrical objects to prevent them from drifting sideways whilst passing along the run-way. Where the objects are to be taped in an upright position, this end-locating means may take the form of a conveyor belt or other convenient conveyor surface upon which the successive objects stand. Where the objects are to be taped with their axes substantially horizontal polished guide surfaces may be employed. It will be appreciated that, where the objects are flanged, for example in the case of electrical capacitors of tubular form with end caps, the wall member may be constructed of suitable width so that the objects will guide themselves along the wall member, the latter being located between the flanges.

The wall member will generally be sprung or resiliently surfaced to accommodate slight differences in the thickness of the cylindrical objects. Generally the backing member located opposite the driven roller will be represented by a continuation of said wall member.

Since the machine of this invention will normally be employed for labelling purposes, that is to say, since the pressure sensitive adhesive tape employed will normally have matter printed thereon, a photoelectric light-sensitive means may be employed to initiate operation of the severing means for the tape. Alternatively, the severing means may be arranged to operate when a predetermined length of tape has been applied to an object, as determined, for example, by the degree of rotation of the tape applying roller.

Figure 2:
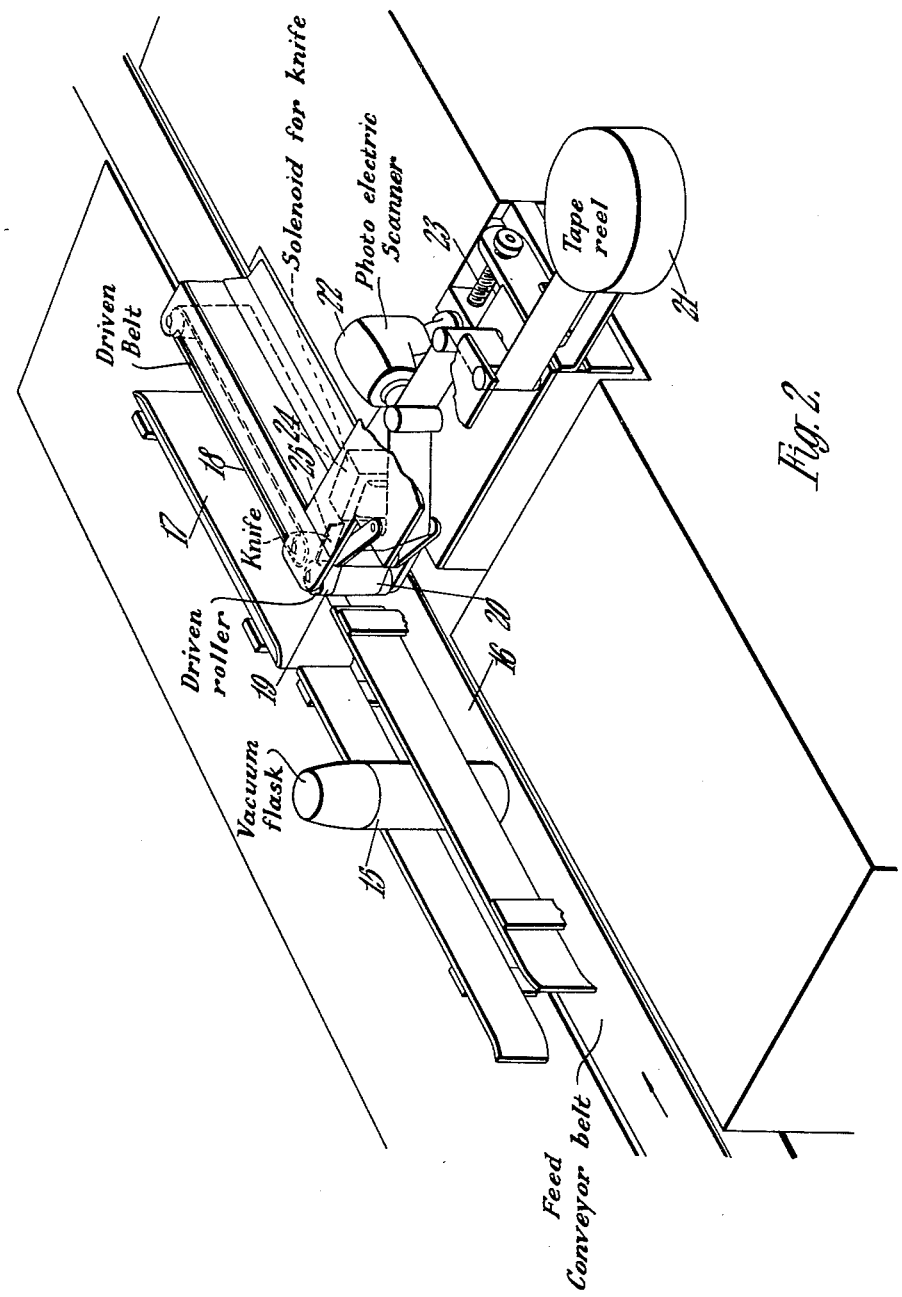

The invention will be described further with reference to the accompanying drawings, of which:

FIGURE 1 is a view of a machine for applying labels to electrical capacitors, and FIGURE 2 is a view of a machine for applying labels to vacuum flask cases.

Referring first to FIGURE 1, a feed trough 1 is provided, sloping so that successive capacitors, not shown, will roll in the direction shown by the arrows. The trough leads to a vertical chute 2 terminating in a flap 3, which may be cam operated, for controlling the release of successive capacitors from the chute. Positioned immediately below the bottom end of the chute is a driven roller 4. This roller, which is resiliently surfaced suitably by means of a rubber sleeve, serves as a tape applying roller the pressure sensitive adhesive tape 5 being led from a reel 6 thereon mounted on the machine. The leading portion 7 of a resiliently mounted wall member 10 serves as backing member against which a capacitor (not shown) emerging at the bottom mouth of the chute is pressed by the roller 4. The leading end 8 of the pressure sensitive adhesive tape is thus pressed against the capacitor, which must pass through the restricted opening defined between the roller 4 and the wall portion 7. The roller 4 rotates in a clockwise direction, withdrawing the capacitor from the chute 2 and rolling it into the run-way defined between a driven belt 9 and the wall member 10. A delivery trough 11 receives the taped capacitors emerging from the run-way in the direction shown by the arrows.

A knife 12 is mounted to sever adhesive tape stretched between the roller 4 and the belt 9. This knife is operated by a solenoid 13 responsive to a photo electric scanner 14 responsive in turn to markings (not shown) incorporated in a known manner on the tape 5. The art of operating a knife by a photoelectric cell reading markings on a tape is well known and does not of itself form part of the invention.

Referring now to FIGURE 2, the successive vacuum flasks 15 are carried by a feed conveyor belt 16 towards a run-way defined between a resiliently mounted wall member 17 and a driven belt 18. The tape applying, driven roller 19 is mounted opposite to the respective end portion of the wall 17, which therefore serves as backing member between which and the roller 19 the flasks 15 are caught to be rolled into the run-way and at the same time have the pressure sensitive adhesive tape 20 pressed thereonto. This tape is fed from a reel 21 past a photoelectric scanner 22, adjustably positioned by the screw 23, for controlling a solenoid 24 to operate a knife 25. The operation of this machine is essentially the same as that of the machine shown in FIGURE 1.

I claim:

1. A machine for applying pressure sensitive tape to cylindrical objects comprising an extended runway including elongated driven belt means and wall means spaced adjacent said driven belt means for passing a cylindrical object therebetween, a driven roller disposed adjacent the inlet end of said runway and in alignment with said driven belt means and extending parallel thereto, said driven roller being spaced forward of the leading end of said belt means and spaced opposite the leading end of said wall means, means for feeding pressure sensitive tape onto said roller with the adhesive face of the tape facing outwardly from the roller, and means for cutting and severing adhesive tape as the tape passes between the space between the roller and said leading end of said belt means.

2. A machine according to claim 1, further comprising end-locating means for the cylindrical objects to prevent them from drifting sideways whilst passing along the runway.

3. A machine according to claim 2, in which the end-locating means takes the form of a conveyor belt or other convenient conveyor surface upon which the successive objects stand.

4. A machine according to claim 2, in which the objects are to be taped with their axes substantially horizontal, and said end-locating means comprises a polished guide surface.

5. A machine according to claim 4 in which the wall member is sprung or resiliently surfaced to accommodate slight differences in the thickness of the cylindrical objects.

6. A machine according to claim 5 in which the backing member located opposite the driven roller is represented by a continuation of said wall member.

References Cited in the file of this patent

UNITED STATES PATENTS

| | | |
|---|---|---|
| 2,482,711 | Jensen | Sept. 20, 1949 |
| 2,639,830 | Weimont | May 26, 1953 |
| 2,799,419 | Scheib | July 16, 1957 |